United States Patent [19]

Nieczyporowicz et al.

[11] Patent Number: 6,061,339
[45] Date of Patent: May 9, 2000

[54] FIXED WIRELESS LOOP SYSTEM HAVING ADAPTIVE SYSTEM CAPACITY BASED ON ESTIMATED SIGNAL TO NOISE RATIO

[75] Inventors: Leon L Nieczyporowicz, W. Jordan; Thomas R Giallorenzi, Herriman; Philip L Stephenson, Salt Lake City; Randal R Sylvester, West Valley City, all of Utah

[73] Assignee: L-3 Communications Corporation, New York, N.Y.

[21] Appl. No.: 08/988,074

[22] Filed: Dec. 10, 1997

[51] Int. Cl.[7] .............................. H04B 7/216; H04Q 7/00
[52] U.S. Cl. ........................ 370/335; 370/329; 370/342; 455/450; 455/453; 375/200
[58] Field of Search .................................. 375/200, 346; 370/335, 342, 252, 332, 331, 329, 236; 455/452, 436, 453

[56] References Cited

U.S. PATENT DOCUMENTS

| | | | |
|---|---|---|---|
| 5,499,236 | 3/1996 | Giallorenzi et al. | 370/18 |
| 5,583,853 | 12/1996 | Giallorenzi et al. | 370/441 |
| 5,708,680 | 1/1998 | Gollnick et al. | 375/220 |
| 5,742,588 | 4/1998 | Thornberg et al. | 370/236 |
| 5,745,480 | 4/1998 | Behtash et al. | 370/252 |
| 5,757,846 | 5/1998 | Vasudevan | 375/200 |
| 5,809,423 | 9/1998 | Benveniste | 455/452 |
| 5,825,835 | 10/1998 | Kingston et al. | 375/367 |
| 5,838,671 | 11/1998 | Ishikawa et al. | 370/335 |
| 5,867,525 | 2/1999 | Giallorenzi et al. | 375/206 |
| 5,884,174 | 3/1999 | Naganajan et al. | 455/436 |
| 5,886,988 | 3/1999 | Yun et al. | 370/329 |
| 6,009,129 | 12/1999 | Kennedy | 375/346 |

*Primary Examiner*—Hassan Kizou
*Assistant Examiner*—John Pezzlo
*Attorney, Agent, or Firm*—Perman & Green, LLP

[57] ABSTRACT

A method is disclosed for operating a fixed wireless system having a radio base unit (RBU) that uses a code division multiple access (CDMA) airlink for communicating with a plurality of subscriber units (SUs). The method includes steps of (a) estimating a signal to noise ratio (SNR) of the FWS; (b) comparing the estimated SNR to a threshold SNR value; and (c) one of allowing service to another SU or not allowing service to another SU based on the result of the step of comparing. The step of estimating preferably uses a normalized SNR, and further employs the use of a null PN code detection technique. More particularly, the step of estimating determines a normalized signal to noise ratio given by Eb/No=20 log (SUT/MUT)–xdB, wherein SUT represents a single user test measurement, wherein MUT represents a multiple user test measurement, and wherein xdB is an adjustment factor. Other types of CDMA systems may also use this technique.

12 Claims, 6 Drawing Sheets

# FIXED WIRELESS LOOP SYSTEM HAVING ADAPTIVE SYSTEM CAPACITY BASED ON ESTIMATED SIGNAL TO NOISE RATIO

FIELD OF THE INVENTION

This invention relates generally to wireless local loop systems and, in particular, a fixed wireless loop system providing voice and data communications between a radio base unit and a plurality of subscriber stations.

BACKGROUND OF THE INVENTION

Local loop by traditional definition is that portion of a network that connects a subscriber's home to a central office switch. This is, however, an expansive definition that does not hold true as the network extends into the local loop by means of Digital Loop Carrier and Digital Cross Connects. For the purposes of this invention, local loop is considered as the connection from the subscriber's premises to the connecting point in the network, whatever the nature of that connection may be.

Until recently the local loop was mostly based on copper plant supplemented by microwave radio links for remote areas or difficult terrain. Over the last decade fiber optics have made significant inroads into the local loop (also referred to as "access" network) reaching closer to subscriber homes and buildings. Sonet based access networks bring fiber to the curb. These fiber based solutions can provide very high bandwidth services, reliably and cost-effectively, in urban/metropolitan areas with significant number of business customers. In fact, most access providers in the U.S. have used such fiber based plant to provide access services to U.S. business customers.

The copper and fiber based solutions, while economical in many situations, still suffer from a number of drawbacks.

For example, in an area without an existing network infrastructure, it is very time consuming and expensive to build a new network. The expense is primarily in the labor, rights acquisition (for right of way or easement), and in electronics (for fiber based access). Overall the process is very slow due to extensive effort involved in acquiring right of way and in performing the required construction, aerial and/or underground. Also, in locations with extensive but congested existing infrastructure, it is often very expensive to add capacity due to already full ducts and cables, and sometimes impossible to add capacity without resorting to upgrading the entire system. In addition, wireline solutions tend to have costs that are distance sensitive, hence they are inherently unsuitable for sparse/scattered demand. Wireline networks are also not amenable to redeployment, which results in stranded assets when demand (consumer) moves. Wireline networks also cannot be rapidly deployed in emergency situations.

The term "fixed wireless loop", or FWL, connotes a fixed wireless based local access. However, it is often mixed with limited mobility solutions under the broader term "Radio Access". Irrespective of the type of radio technology, all fixed wireless or radio access systems use wireless means to provide network access to the subscriber. Broadly speaking, there are three main categories of fixed wireless solutions.

Fixed cellular systems are primarily based on existing analog cellular systems like AMPS (in North America) or NMT (in Nordic countries).

Fixed cordless systems are primarily based on the European DECT standard using digital TDMA Time Division Duplex technology.

Bespoke systems are designed specifically for fixed wireless application. Conventional systems in this category are the analog microwave point to multi-point systems. More recently deployed systems operate at higher frequencies and employ digital technologies. These systems may be derived from similar cellular technologies, but are not based on any existing agreed standards.

Of the three main categories of fixed wireless systems there is no one solution that is clearly superior to others. If the primary need for a system operator is to provide voice oriented service wherein voice quality is not a limiting factor, then often a fixed cellular system is adequate, and even desirable because of its relatively low equipment cost. For very high density urban situations, a DECT solution may be desirable due to its high load carrying capacity and its pico-cellular architecture. Microwave solutions are best for sparse populations. Bespoke systems function well over a wide range of situations and have the best overall quality and desirable features, however they are likely to be more expensive, at least in the near future.

Most residential consumers in developing economies are mainly interested in adequate voice service. However, most business customers require data and fax service in addition to voice. With the growing popularity of home computers and Internet access, a need is arising to provide residential consumers with high speed data services at home. As such, the general trend is in the direction that all customers, both residential and business, will demand high quality voice and data services.

A problem that arises in a highly reliable and low transmission error FWL system is in defining a metric that can be used to adaptively allocate system capacity. For example, in some conventional communication systems a bit error rate (BER), or frame error rate (FER), or symbol error rate (SER) can be determined. In such a system, and further by example, as the SER increases the capacity of the system can be reduced by decreasing the number of active users. Conversely, as the SER decreases more users can be added, thereby increasing the system capacity.

However, in a low error rate synchronous-CDMA (S-CDMA) system, such as one of most interest to the teaching of this invention, the bit, frame and symbol error rates may be so low and infrequent as to make the conventional BER, FER or SER an unsuitable indicator for determining system capacity adjustments.

OBJECTS AND ADVANTAGES OF THE INVENTION

It is a thus a first object and advantage of this invention to provide an improved fixed wireless loop system that fulfills the foregoing and other needs and requirements.

It is a further object and advantage of this invention to provide an improved CDMA system that adaptively adjusts system capacity based on a signal to noise ratio determination.

SUMMARY OF THE INVENTION

The foregoing and other problems are overcome and the objects of the invention are realized by methods and apparatus in accordance with embodiments of this invention.

A method is disclosed for operating a CDMA communications system, such as a fixed wireless system (FWS) having a radio base unit (RBU) that uses a code division multiple access (CDMA) airlink for communicating with a plurality of subscriber units (SUs). The method includes steps of (a) estimating a signal to noise ratio (SNR) of the FWS; (b) comparing the estimated SNR to a threshold SNR value; and (c) one of allowing service to another SU or not allowing service to another SU based on the result of the step of comparing.

The step of estimating preferably uses a normalized SNR, and further employs the use of a null PN code detection technique. More particularly, the step of estimating determines a normalized signal to noise ratio given by:

Eb/No=20 log(SUT/MUT)−xdB, where SUT represents a single user test measurement, where MUT represents a multiple user test measurement, and where xdB is an adjustment factor.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 1:
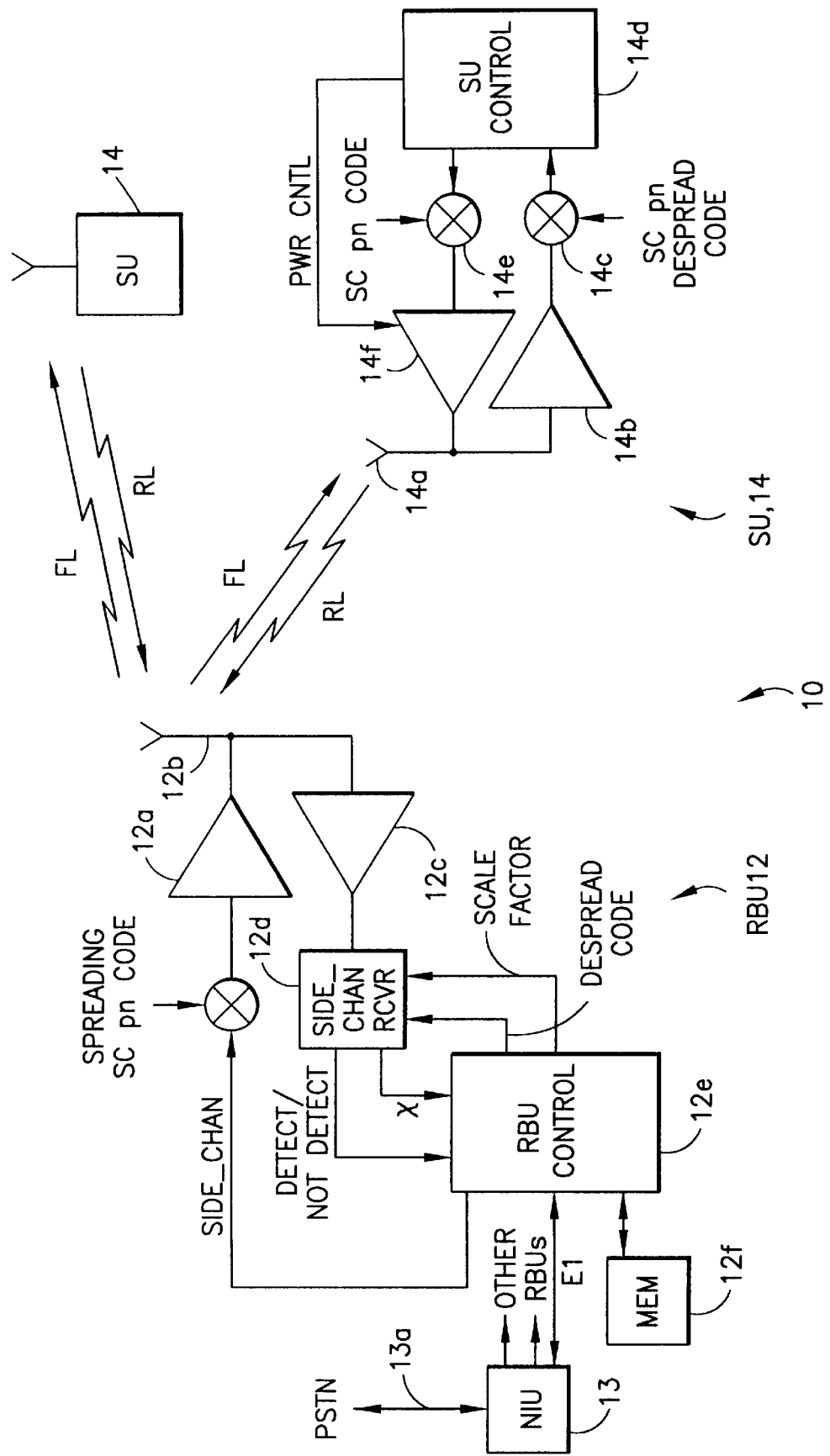
FIG. 1 is a simplified block diagram of a synchronous, DS-CDMA fixed wireless communications system in accordance with this invention, the system having a radio base unit (RBU) and a plurality of transceiver or subscriber units (SUs). The RBU transmits a side channel to the SUs, and also receives an essentially asynchronously transmitted side channel from the SUs.

By way of introduction, and referring to FIG. 1, a Fixed Wireless System (FWS) 10 in accordance with a preferred embodiment of this invention is a bespoke system based on digital radio technology. Specifically, the FWS 10 employs direct sequence spread spectrum based CDMA techniques over an air link to provide local access to subscribers. It offers very high quality, highly reliable service at costs that are very competitive with wireline solutions. The FWS 10 exhibits high spectral efficiency and thus can provide good wireline quality service with limited available bandwidth. A large dynamic range allows the FWS 10 to be deployable in a pico, micro, or mini cellular architecture meeting specific needs of dense metropolitan, urban, and suburban communities in an economical way.

Some important attributes of the FWS 10 include: wireline voice quality delivered at 32 Kbps; high throughput for data and fax applications with 32/64 Kbps throughput; high service reliability with good tolerance for noise and ingress; secure airlink; and support of enhanced services such as priority/emergency calling, both inbound and outbound.

The FWS 10 has a three to five times capacity advantage over conventional asynchronous CDMA technologies, and a three to seven times capacity advantage over currently available Time Division Multiple Access (TDMA) technology, due to its ability to use a frequency reuse of one.

The FWS 10 is a synchronous CDMA (S-CDMA) communications system wherein forward link (FL) transmissions from a radio base unit (RBU) 12 for a plurality of transceiver units, referred to herein as user or subscriber units (SUs) 14, are symbol and chip aligned in time, and wherein the SUs 14 operate to receive the FL transmissions and to synchronize to one of the transmissions. Each SU 14 also transmits a signal on a reverse link (RL) to RBU 12 in order to synchronize the timing of its transmissions to the RBU 12, and to generally perform bidirectional communications. The FWS 10 is suitable for use in implementing a telecommunications system that conveys voice and/or data between the RBU 12 and the SUs 14.

The SU 14 forms a portion of a Customer Premises Equipment (CPE). The CPE also includes a Network Termination Unit (NTU) and an Uninterruptible Power Supply (UPS), which are not illustrated in FIG. 1.

The RBU 12 includes circuitry for generating a plurality of user signals (USER_1 to USER_n), which are not shown in FIG. 1, and a synchronous side channel (SIDE_CHAN) signal that is continuously transmitted. Each of these signals is assigned a respective pn spreading code and is modulated therewith before being applied to a transmitter 12a having an antenna 12b. When transmitted on the FL the transmissions are modulated in phase quadrature, and the SUs 14 are assumed to include suitable phase demodulators for deriving in-phase (I) and quadrature (Q) components therefrom. The RBU 12 is capable of transmitting a plurality of frequency channels. By example, each frequency channel includes up to 128 code channels, and has a center frequency in the range of 2 GHz to 3 GHz.

The RBU 12 also includes a receiver 12c having an output coupled to a side channel receiver 12d. The side channel receiver 12d receives as inputs the spread signal from the receiver 12c, a scale factor signal, and a side channel despread pn code. These latter two signals are sourced from a RBU processor or controller 12e. The scale factor signal can be fixed, or can be made adaptive as a function of the number of SUs 14 that are transmitting on the reverse channel. The side channel receiver 12d outputs a detect/not detect signal to the RBU controller 12e for indicating a detection of a transmission from one of the SUs; 14, and also outputs a power estimate value χ, as described below. A read/write memory (MEM) 12f is bidirectionally coupled to the RBU controller 12e for storing system parameters and other information, such as SU timing phase information and power estimate values.

A Network Interface Unit (NIU) 13 connects the RBU 12 to the public network, such as the public switched telephone network (PSTN) 13a, through analog or digital trunks that are suitable for use with the local public network. The RBU 12 connects to the NIU 13 using E1 trunks and to its master antenna 12b using a coaxial cable. The SU 14 communicates with the RBU 12 via the radio interface, as described above.

In addition, the FWS 10 has an Element Management System or EMS (not depicted) that provides Operations, Administration, Maintenance, and Provisioning (OAM&P) functions for the NIU 13 and RBU 12. The functioning of the EMS is not germane to an understanding of this invention, and will not be further described in any great detail.

The NIU 13 is the interface to the public network for the system 10. Its primary purpose is to provide the specific protocols and signaling that are required by the public network. These protocols can vary by country as well as by customer, and possibly even by the connecting point in the network.

In a preferred embodiment of this invention the NIU 13 can connect to a maximum of 15 RBUs 12 using one to four E1 connections per RBU 12, with four E1 connections being used for a fully populated RBU 12. In addition, each NIU 13 is sized for up to, by example, 10,000 subscribers. Time Slot 16 on each E1 trunk is used for passing control information between the NIU 13 and the attached RBUs 12, as well as for passing information to and from the controlling EMS. The protocol is based on the HDLC format and optimized to enhance RBU-NIU communication.

Specific functions provided by the NIU 13 include: initialization of the RBU 12; provisioning of dial tone and DTMF to the SUs 14; set up and tear down of voice and data calls; maintenance of Call Detail Record (CDR) data; HDLC Protocol (data link protocol to RBU Link Control Processor); billing system interface; Common Channel Signaling (CCS) for ringing and onhook/offhook detection; glare detection in NIU, RBU, and SU; call priority management; channel reassignment for calls in progress; detection of hook flash to enable plain old telephone service (POTS) and enhanced POTS calling features; 32/64 Kbps rate change initialization; pay phone capability (12/16 KHz tone detection, line reversal); priority and emergency number calling; accommodation of country specific signaling interfaces such as E&M, R1, R2, R2 variants, and C7; and system modularity: analog/digital options for both line side and trunk side.

The normal mode of operation for the SU 14 is a compressed speech mode using ADPCM encoding according to the ITU-T G.721 standard. This toll quality, 32 Kbps service is the default used whenever a non-X.21 channel is established with the RBU 12 (X.21 channels are configured a priori when provisioned by the EMS/NIU). The 32 Kbps channels may be us ed for voice band data up to 9600 b/s if desired. When the channel rate bumps to 64 Kbps PCM encoded voice/data due to detection of a fax/modem start tone, fax and modem rates of at least 33.6 Kbps are possible.

Figure 2:
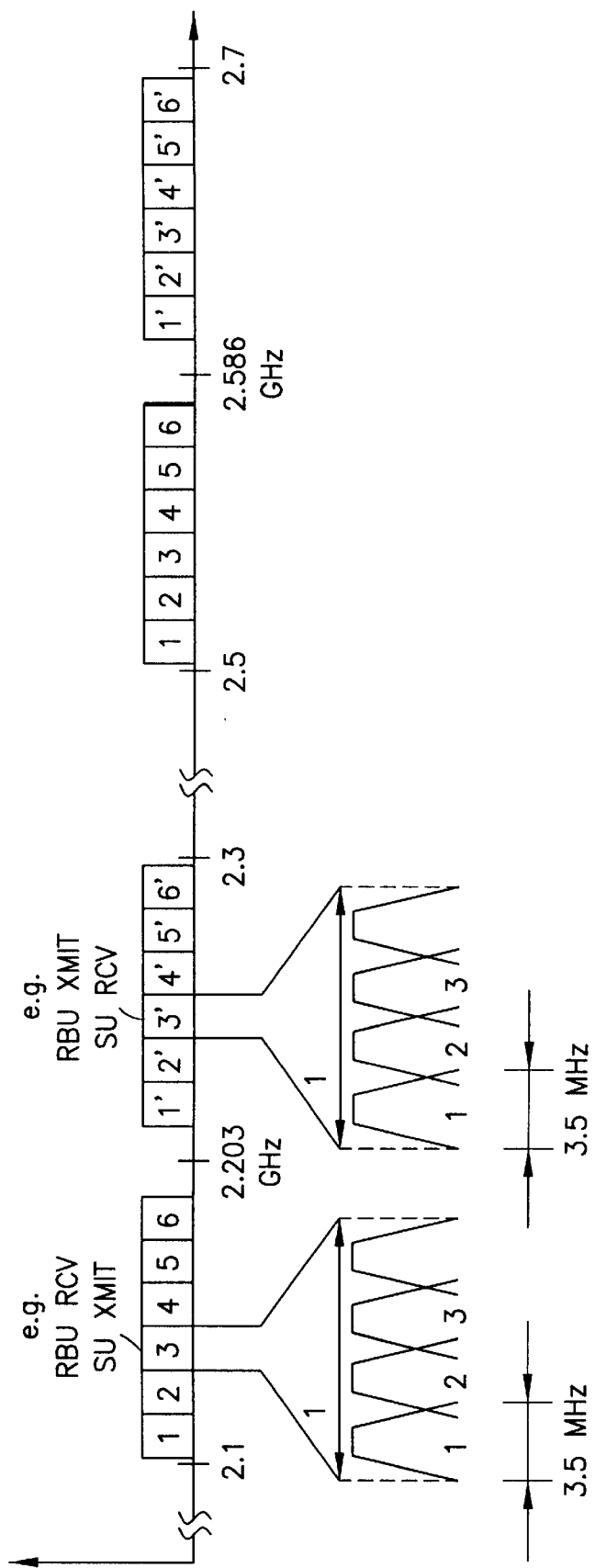
FIG. 2 is an exemplary frequency allocation diagram of the system of FIG. 1.

The SU-RBU air link provides a separate 2.72 MHz (3.5 MHz including guardbands) channel in each direction separated by either 91 MHZ or 119 MHz of bandwidth. The nominal spectrum of operation is 2.1–2.3 GHz or 2.5–2.7 GHz. However, the system is designed such that the frequency can be varied from 1.8 to 5 GHz provided the spectral mask and separation between transmit and receive frequencies is maintained as per ITU 283.5 specification. As pen the ITU 283.5 specification, there are a total of 96 frequency pairs allowed, as shown in FIG. 2. By example, the RBU 12 may transmit in the 3' frequency band and receive in the 3 frequency band, and the SU 14 transmits in the 3 frequency band and receives in the 3' frequency band.

The RBU 12 can support 128 simultaneous 34 Kbps channels using the 2.72 MHz bandwidth giving it a spectral efficiency of 1.6 bits/Hz. Of this total capacity, 8 channels are used by the FWS 10 and an additional 2 Kbps per channel is system overhead. Thus the (effective traffic carrying capacity is 120 channels at 32 Kbps.

The spectral efficiency of the FWS 10 is three to five times that of conventional CDMA systems primarily because the FWS 10 employs bi-directional Synchronous CDMA. Competing systems, including those based on IS-95, are asynchronous or synchronous only in one direction. The bi-directional synchronicity permits the FWS 10 to use near orthogonal spreading codes and gain maximum possible data carrying capacity.

Radio emissions lose energy as they travel in air over long distances. In order to ensure that the received signal energy from a distant subscriber is not completely overwhelmed by that of a near subscriber, the RBU 12 controls the power level of the SUs 14. In the preferred embodiment only the reverse channel power (from SU 14 to the RBU 12) is controlled by the RBU 12. The power control is primarily established at SU 14 initialization.

Subsequent power adjustments are infrequent and are made in response to transient environmental conditions. The closed loop power control is implemented by comparing against a desired power level and making incremental adjustments until the desired level is achieved.

The forward channel power control is not needed since each SU 14 receives its entire signal at only one level. The RBU 12 merely needs to ensure that the received signal strength by the farthest SU 14 is sufficient for its application.

It is not always desirable to have an extended range. In a dense urban or even a suburban setting, one needs to deploy the system in a cellular architecture as depicted below. To reduce interference between sectors and between cells in such a deployment, the range of the RBU is limited overall as well as selectively in specific directions. Such range control may be accomplished using a directional master antenna 12b at the RBU 12, as well by controlling overall RBU power.

When one of the SUs 14 detects an off-hook (the user has picked up the phone), it transmits an outgoing call request on one of six reverse synchronous side channels in a Slotted ALOHA fashion. The side channel is chosen at random. The RBU 12 processes the request and, providing an active channel is available, sends an outgoing call reply to the SU 14 which contains the active channel comes (both forward and reverse). In the meantime, the RBU 12 begins to transmit forward side channel data on the newly activated channel and at a given time, begin to transmit the active call data. The SU 14, which is listening to the forward side channel, receives the active channel assignment and switches at a superframe boundary to the active codes. The SU 14 then begins to receive the side channel data and then the active call data.

When an incoming call is received by the NIU 13 for one of the SUs 14 in the local loop, the RBU 14 is notified over the E1 link. The RBU 12 first checks to determine if the intended SU 14 is busy. If not, the RBU 14 sends a message to the SU 14 on the forward side channel, the message containing the active channel codes. The call processing then continues in the same manner as the outgoing call processing discussed above.

If all channels are busy and the NIU 13 receives an incoming call for a non-busy SU 14, it provides a subscriber busy tone to the caller unless the called SU has priority inbound access (such as a hospital, fire station, or police), in which case the NIU 13 instructs the RBU 12 to drop the least priority call to free up a channel for the called SU 14. Similarly, if an SU 14 initiates a request for service and no traffic channels are open, then the RBU 12 provides the dial tone on a temporary traffic channel and receives the dialed number. If the dialed number is an emergency number the RBU 12 drops a least priority call to free up a traffic channel and connects the free channel to the SU 14. If the called number is not an emergency number then the SU 14 is provided a special busy tone indicating a "wait for service" condition.

Figure 6:
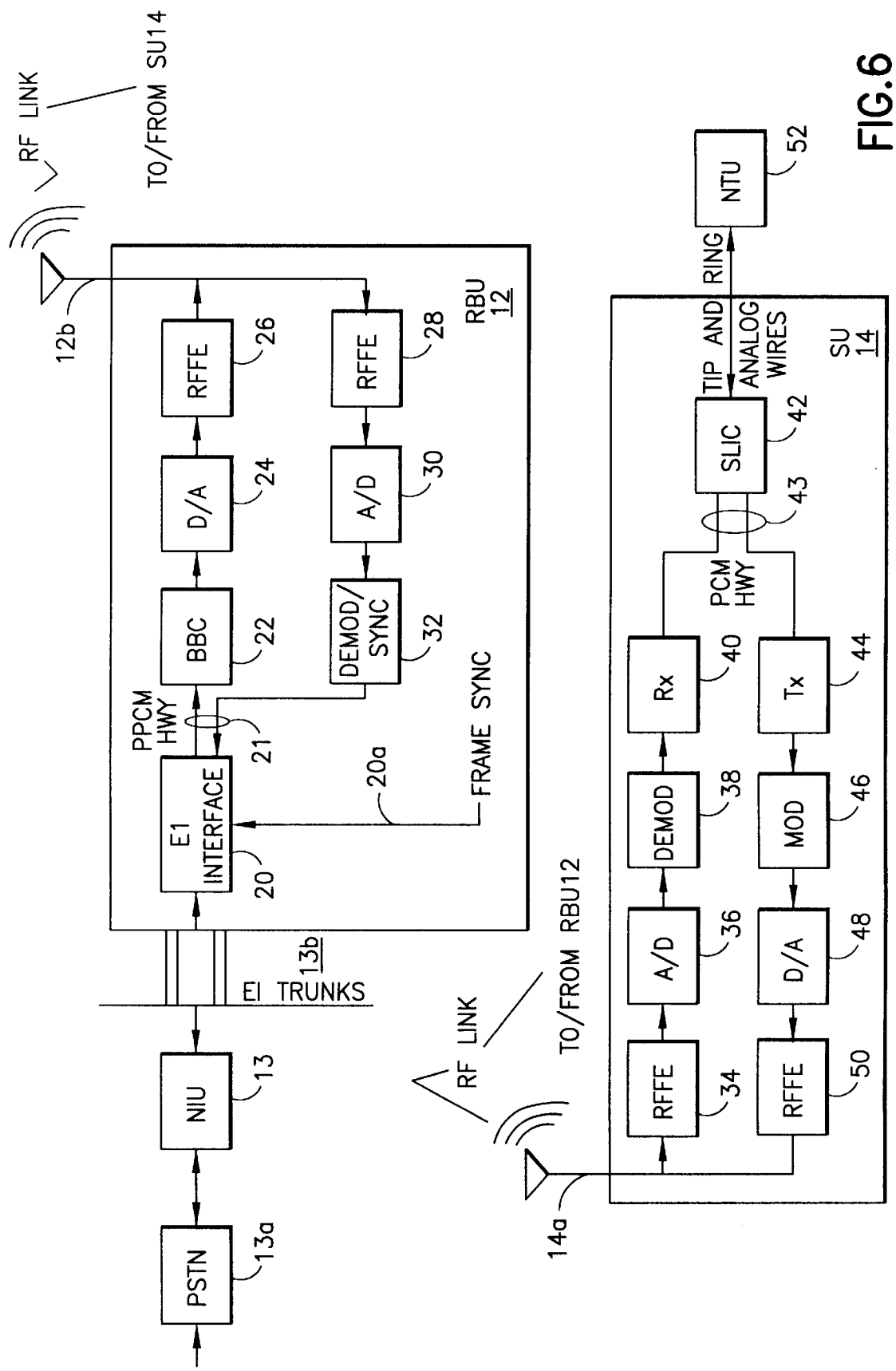
FIG. 6 is a block diagram illustrating the RBU and SU of FIG. 1 in greater detail.

Reference is now made to FIG. 6 for illustrating the RBU 12 and SU 14 in greater detail.

An incoming call from the PSTN 13a passes through the NIU 13 to 64 Kbps per channel E1 trunks 13b and then to a RBU-resident E1 interface 20. The E1 interface 20 optionally performs an A-Law ADPCM algorithm for the compression of the 64 Kbps channel to a 32 Kbps channel that is placed on a PCM highway 21 time slot. If the A-Law ADPCM compression is bypassed, the 64 Kbps channel is split into two 32 Kbps channels and placed onto the PPCM Highway 21. In the preferred embodiment the RBU 12 can accommodate up to 128 32 Kbps channels, and each SU 14 can accommodate up to four 32 Kbps channels. The PPCM Highway 21 operates in conjunction with a frame synchronization (FrameSync) signal 20a, which represents a master timing pulse that is generated every 16 ms. All calls to and from the RBU 12 pass through the PPCM Highway 21 and the E1 interface 20.

For the case of an incoming call the signal is applied to a baseband combiner (BBC) 22 and thence to a D/A converter 24 and a transmit radio frequency front-end (RFFE) 26 before being applied to the antenna 12b for transmission to the SU 14. At the SU 14 the incoming call signal is received by the antenna 14a and is applied to a receive RFFE 34, an A/D 36, demodulator 38 and a receiver 40. The SU 14 includes a subscriber line interface circuit (SLIC) 42 that couples a pulse code modulation (PCM) Highway 41 to a network termination unit (NTU) 52. In the reverse direction a call originates at the NTU 52 and passes through the SLIC 42 and PCM Highway 41 to a transmitter 44, modulator 46, D/A converter 48 and a transmit RFFE 50. The signal is applied to the SU antenna 14a and is received by the RBU antenna 12b. The received signal is applied to a receive RFFE 28, A/D converter 30, a demodulator and synchronization unit 32, and then to the PPCM Highway 21 and E1 interface 20 for connection to the PSTN 13a via one of the E1 trunks 13b and the NIU 13.

The RBU 12 controls the master timing for the entire FWS 10. Timing throughout the FWS 10 is referenced to the periodic timing pulse generated at the PPCM Highway 21, i.e., to the FrameSync signal 20a. In the FWS 10 all data is grouped into equal-sized packets referred to as frames, which in turn are grouped into super-frames with, for example, three frames making up one super-frame.

Having described the overall architecture and capabilities of the FWS 10, a detailed description of this invention will now be made.

As was stated above, in the S-CDMA FWS 10 the conventional BER, FER or SER metrics may be of little value in determining system capacity, as transmission errors are infrequent. In accordance with this invention an estimate of the signal to noise ratio (SNR) is determined, and the system capacity determinations are based on the estimated SNR.

A description will first be provided of a presently preferred technique for estimating the SNR, in particular a normalized Eb/No ratio where $E_b$ is the energy per bit and $N_o$ is the noise, followed by a description of a presently preferred technique for using the estimated SNR to adaptively vary the system capacity.

In the preferred SNR estimation technique a normalized signal to noise ratio (Eb/No) is determined. In the FWS 10 the energy per bit ($E_b$) is referred to as a SUT (Single User Test) measurement. The estimate is formed as follows. If one defines the amplitude of the signal as A then the received signal is $$r(t)=N(B,\sigma^2)+jN(C,\sigma^2) \qquad (1)$$

where $N(\mu,\sigma^2)$ is a normal distribution with mean $\mu$ and variance $\sigma_2$. Then B and C can be defined as $$B=A\cos(\theta) \qquad (2)$$

$$C=A\sin(\theta) \qquad (3)$$

where θ is the phase error. By example, θ has been found to be approximately 10°, worst case. Using this information equation 2 can be rewritten as $$B=0.985A \qquad (4)$$

which leads to a 0.13 dB (20 log(1)–20 log(0.985)) error. Therefore one could assume that the phase error is negligible in this case. Then equation 1 can be rewritten as $$r(t)=N(A,\sigma^2)+jN(O,\sigma^2) \qquad (5)$$

The detector output (D) can now be described by $$D_{BP}^{(sig)} = E\{\max\{|N(A,\sigma^2)|, |N(O,\sigma^2)|\}\} \qquad (6)$$

It is useful to recall an identify to describe the max function, namely $$E\{\max\{|I|,|Q|\}\}=\tfrac{1}{2}\{E\{|I+Q|\}+E\{|I-Q|\}\} \qquad (7)$$

and $$I=s_I+n_I$$

$$Q=s_Q+n_Q$$

where $n_I$ and nQ are zero mean Gaussian random variables. In the presently preferred embodiment of the S-CDMA system, if there are no other users active or there are more than 5 users active (the general case) then the statistics of $n_I$ and $n_Q$ are adequately Gaussian. Using equation 7 one can rewrite equation 6 to obtain the mean of the detector output.

$$\begin{aligned} D_{BP}^{(sig)} &= \tfrac{1}{2}\{E\{|N(A,\sigma^2)|\}+E\{|N(O,\sigma^2)|\}\} \\ &= \tfrac{1}{2}\{E\{|N(A,2\sigma^2)|\}+E\{|N(A,2\sigma^2)|\}\} \\ &= E\{|N(A,2\sigma^2)|\} \end{aligned} \qquad (8)$$

The result in equation 8 shows that the output is noncentral Chi distributed with a single degree of freedom. The first moment can be calculated using the following equation found in Proakis, Digital Communications 2nd ed., McGraw-Hill 1989. Equation 9 shows the mean of the detector output for this particular case.

$$D_{BP}^{(sig)} = 2\sigma e^{-\frac{A^2}{4\sigma^2}} \sum_{k=0}^{\infty} \frac{\left[\frac{A^2}{4\sigma^2}\right]^k}{\Gamma\left(\frac{1}{2}+k\right)} \quad (9)$$

Equation 9 gives the mean output of an absolute value detector choosing the larger of the I or Q channel.

Because of the confusion involved with the discussion of Eb/No versus SNR (especially in coded systems) it is useful to derive it. First, define the variance in the following way.

$$\sigma^2 = \frac{N_o}{2} \quad (10)$$

Then if one normalizes T (the bit period) to one the following relations can be shown.

$$\frac{E_b}{N_o} = \frac{A^2 T}{2\sigma^2} = \frac{A^2}{2\sigma^2} \quad (11)$$

It can then be seen that $$\frac{E_b}{N_o} = 20 \log\left[\frac{A}{\sigma}\right] - 3\text{dB} \quad (12)$$

To consider the effects of coding and the modulation scheme one can define the following relation.

$$E_b = \frac{1}{R} E_s \quad (13)$$

Then R can be defined as $$R = M R_c \quad (14)$$

where R is the overall coding rate, Rc is the coding rate applied to the serial bit stream, and $2^M$ is the number of points in the constellation.

For example, assume that the channel is QPSK modulated with rate 1/2 coding. This gives $R_c=0.5$ and M=2, which means that R=1. This implies that $E_b$ and $E_s$ are equal and Eb/No can be defined as in equation 15.

$$\frac{E_b}{N_o} = 20 \log\left[\frac{A}{\sigma}\right] - 3\text{dB} \quad (15)$$

In the presently preferred embodiment of this invention the channel is QPSK modulated with rate 4/5 coding. This gives $R_c=4/5$ and M=2, which means that R=8/5. This implies that $E_b$ and $E_s$ are different and Eb/No can be defined as in equation 16.

$$\frac{E_b}{N_o} = 20 \log\left[\frac{A}{\sigma}\right] - 3\text{dB} + 10 \log\left[\frac{5}{8}\right] \quad (16)$$

Figure 3:
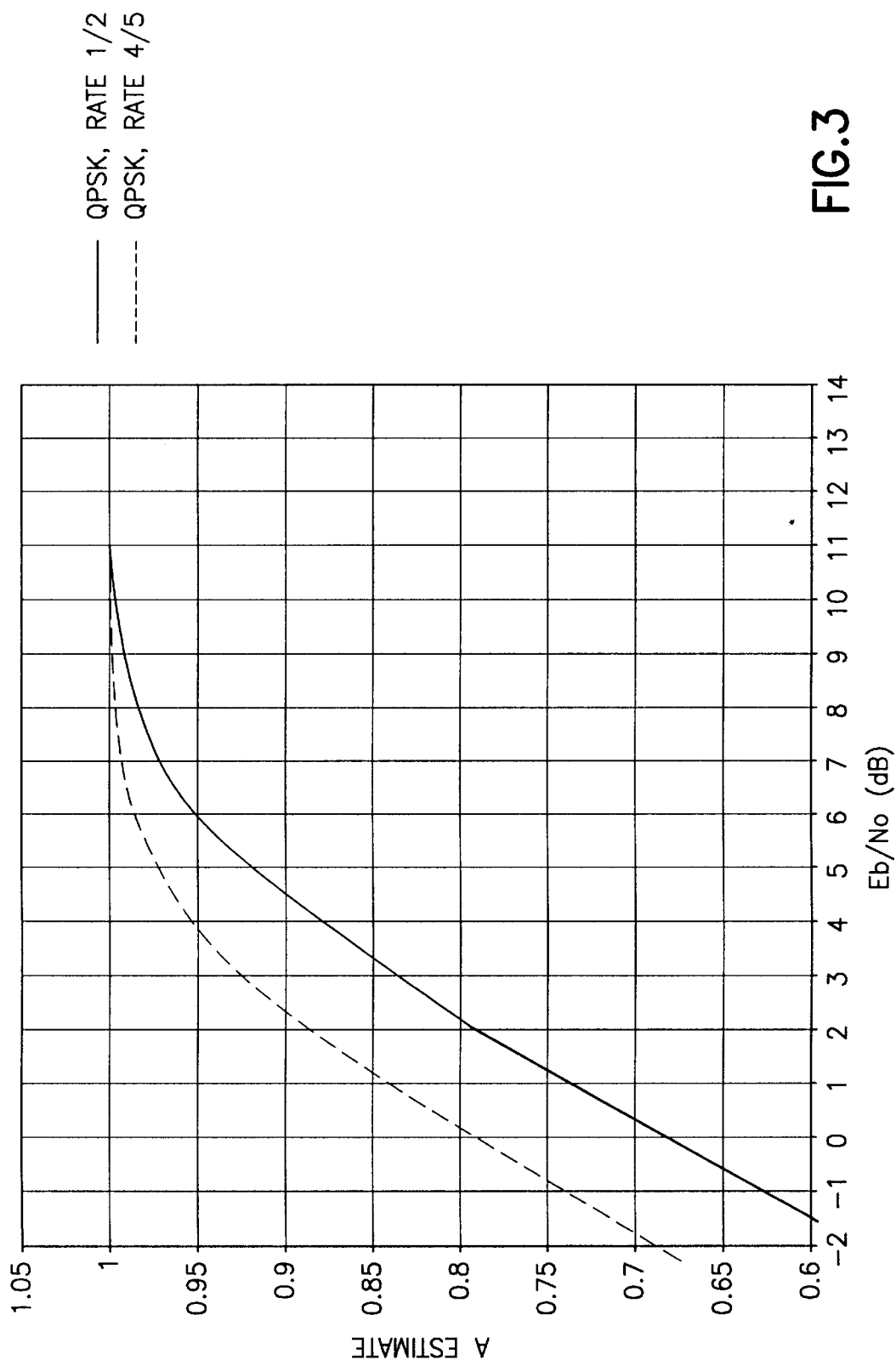
FIG. 3 is a graph $D_{BP}^{(Sig)}$ an estimate of the signal amplitude A) versus Eb/No for a QPSK, rate 1/2 and a QPSK, rate 4/5 embodiment of the system.

Using the relationships from equations 15 and 16 between Eb/No and $A^2/\sigma^2$ it is possible to plot $$D_{BP}^{(Sig)}$$

versus Eb/No. This done by fixing the signal level (A) to one and varying the standard deviation ($\sigma$). FIG. 3 shows $$D_{BP}^{(Sig)}$$

(which is an estimate of the signal amplitude A) versus Eb/No for the rate 1/2 and rate 4/5 embodiments. When the estimate is 0.89 this corresponds to a 1 dB error in the estimate of Eb.

When estimating the noise variance there are two suitable methods that can be employed. The first method simply uses an absolute value detector, while the second method uses an absolute value detector followed by a "bigger picker". In both of these cases the received signal can be defined as shown in equation 17.

$$r(t) = N(O,\sigma^2) + jN(O,\sigma^2) \quad (17)$$

If the detector is simply an absolute value detector then the mean detector output can be written as $$D_{AB}^{(N)} = E\{|N[O,\sigma^2]|\} \quad (18)$$

The detector is central Chi distributed with a mean defined by the following equation.

$$D_{AB}^{(N)} = (2\sigma^2)^{\frac{1}{2}} \frac{\Gamma(1)}{\Gamma\left(\frac{1}{2}\right)} \quad (19)$$

$$D_{AB}^{(N)} = (2\sigma^2)^{\frac{1}{2}} \frac{1}{\sqrt{\pi}}$$

If $$D_{AB}^{(N)}$$

was measured then sigma can be solved for using equation 19.

$$\sigma = D_{AB}^{(N)} \sqrt{\frac{\pi}{2}} \quad (20)$$

Equation 20 shows that estimating the noise power through an absolute value detector gives rise to an adjustment factor that needs to be included. To determine the adjustment factor consider $$\frac{A^2}{\sigma^2} = \frac{A^2}{D_{AB}^{(N)2} \frac{\pi}{2}} = \frac{A^2}{D_{AB}^{(N)2}} \frac{2}{\pi} \quad (21)$$

then $$20\log\left(\frac{A}{\sigma}\right) = 20\log\left(\frac{A}{D_{AB}^{(N)}}\right) + 10\log\left(\frac{2}{\pi}\right) \quad (22)$$
$$= 20\log\left(\frac{A}{D_{AB}^{(N)}}\right) - 1.9612$$

where the adjustment factor is −1.9612 dB. Alternatively if the received signal in equation 17 is applied through an absolute value detector followed by a bigger picker the mean output of the detector becomes $$D_{BP}^{(N)} = E\{\max\{|N(O, \sigma^2)|, |N(O, \sigma^2)|\}\} \quad (23)$$

Then as was done in the signal estimation case one can use equation 7 to eliminate the max function from equation 23.

$$D_{BP}^{(N)} = \frac{1}{2}\{E\{|N(O, \sigma^2) + N(O, \sigma^2)|\} + E\{|N(O, \sigma^2) - N(O, \sigma^2)|\}\} \quad (24)$$
$$= \frac{1}{2}\{E\{|N(O, 2\sigma^2)|\} + E\{|N(O, 2\sigma^2)|\}\}$$
$$= E\{|N(O, 2\sigma^2)|\}$$

The result obtained in equation 24 is now reduced to the problem worked for the absolute value detector without the bigger picker, except that the variance is, 2σ instead of σ. This allows equation 20 to be rewritten for the "bigger picker" as follows $$\sqrt{2}\,\sigma = D_{BP}^{(N)}\frac{\sqrt{\pi}}{2}$$

or $$\sigma = D_{BP}^{(N)}\frac{\sqrt{\pi}}{2} \quad (25)$$

Then the adjustment factor becomes +1.038 db.

$$20\log\left(\frac{A}{\sigma}\right) = 20\log\left(\frac{A}{D_{BP}^{(N)}}\right) + 20\log\left(\frac{2}{\sqrt{\pi}}\right) \quad (26)$$
$$= 20\log\left(\frac{A}{D_{BP}^{(N)}}\right) + 1.0388$$

The estimate of Eb/No should be obtainable at the RBU 12 and the SU 14. This section discusses; the method for obtaining the estimates in each device.

In the RBU 12 the signal estimate if formed by routing a despread active signal to a PN correlator accumulator (PNCA) and accumulating for some number of symbols. The output of the PNCA is termed the single user test (SUT). The mean SUT can be defined in terms of equation 8 as $$SUT = nD_{BP}^{(Sig)} \quad (27)$$

where n is the number of accumulated samples. Also note that as n approaches infinity SUT gets closer to n times the mean "D".

The noise estimate is referred to as the multi-user test (MUT). In the SU 14 this is found by running a null code (a PN code that is not used by the system) in the phase channel despreader and feeding this bit stream into the PNCA and accumulating for n symbols. In this case the "bigger picker" can be switched using the level channel information. This effectively removes the bigger picker from the noise estimate since the larger noise term is uncorrelated with the channel (I or Q) that the signal happens to be transmitted on. In this case the noise estimate needs the factors relating to the absolute value detector and equation 22 thus provides the correct factor. Now starting with equation 12 the proper additional factors can be added to provide an accurate estimate of Eb/No for the SU 14.

$$\frac{E_b}{N_o} = 20\log\left(\frac{SUT}{MUT}\right) - 4.9612 \text{ dB} \quad (28)$$

The RBU 12 calculates the MUT through it's own channel i.e. exactly as if it were a SUT test except it uses the null code for despreading. This means that the bigger picker is being used and the Eb/No estimate can be found by use of equations 12 and 26.

$$\frac{E_b}{N_o} = 20\log\left(\frac{SUT}{MUT}\right) - 1.9612 \text{ dB} \quad (29)$$

In the presently preferred embodiment of the SU 14 there are two PNCA accumulators to provide for 4 possible channels, and the appropriate equations are 16 and 26.

$$\frac{E_b}{N_o} = 20\log\left(\frac{SUT}{MUT}\right) - 4.0024 \text{ dB} \quad (30)$$

In the presently preferred embodiment of he RBU 12, using the 4/5 coding, the appropriate versions of the equations are equations 16 and 26.

$$\frac{E_b}{N_o} = 20\log\left(\frac{SUT}{MUT}\right) - 4.0024 \text{ dB} \quad (31)$$

In the foregoing examples both absolute value detectors and absolute value detectors with a bigger picker have been used to estimate Eb/No.

Further with regard to the foregoing reference can be made to commonly assigned and allowed U.S. patent application Ser. No. 08/606,378, filed Feb. 23, 1996, entitled "A Multi-User Acquisition Procedure for Point-To-Multipoint Synchronous CDMA Systems", by S. C. Kingston, T. R. Giallorenzi, R. R. Sylvester, D. Matolak, and P. Smith, the disclosure of which is incorporated by reference herein in its entirety. In this commonly assigned patent application a technique is disclosed for the SU 14 to acquire the correct code timing for a synchronous CDMA forward channel link in the presence of multi-user interference (MUI). This technique exploits the orthogonality of the PN codes used to determine the proper code phase by purposely despreading a PN code (i.e., a null code) which is known to not be present (i.e., not transmitted by the RBU 12). This is done to overcome the problem that arises when using a conventional acquisition procedure when many users are active. In this case the interference energy of P-1 interfering users, with processing gain P, can be nearly as strong as the energy of the desired user's signal. As a result, the standard acquisition approach, wherein a detection is declared when the energy of a matched filter output (or sliding correlator output) is larger than a threshold, is not viable in a heavily loaded system. A simplifying assumption made herein is that the frequency offset between the carrier of the incoming signal and the receiver's local oscillator is zero.

Figure 5:
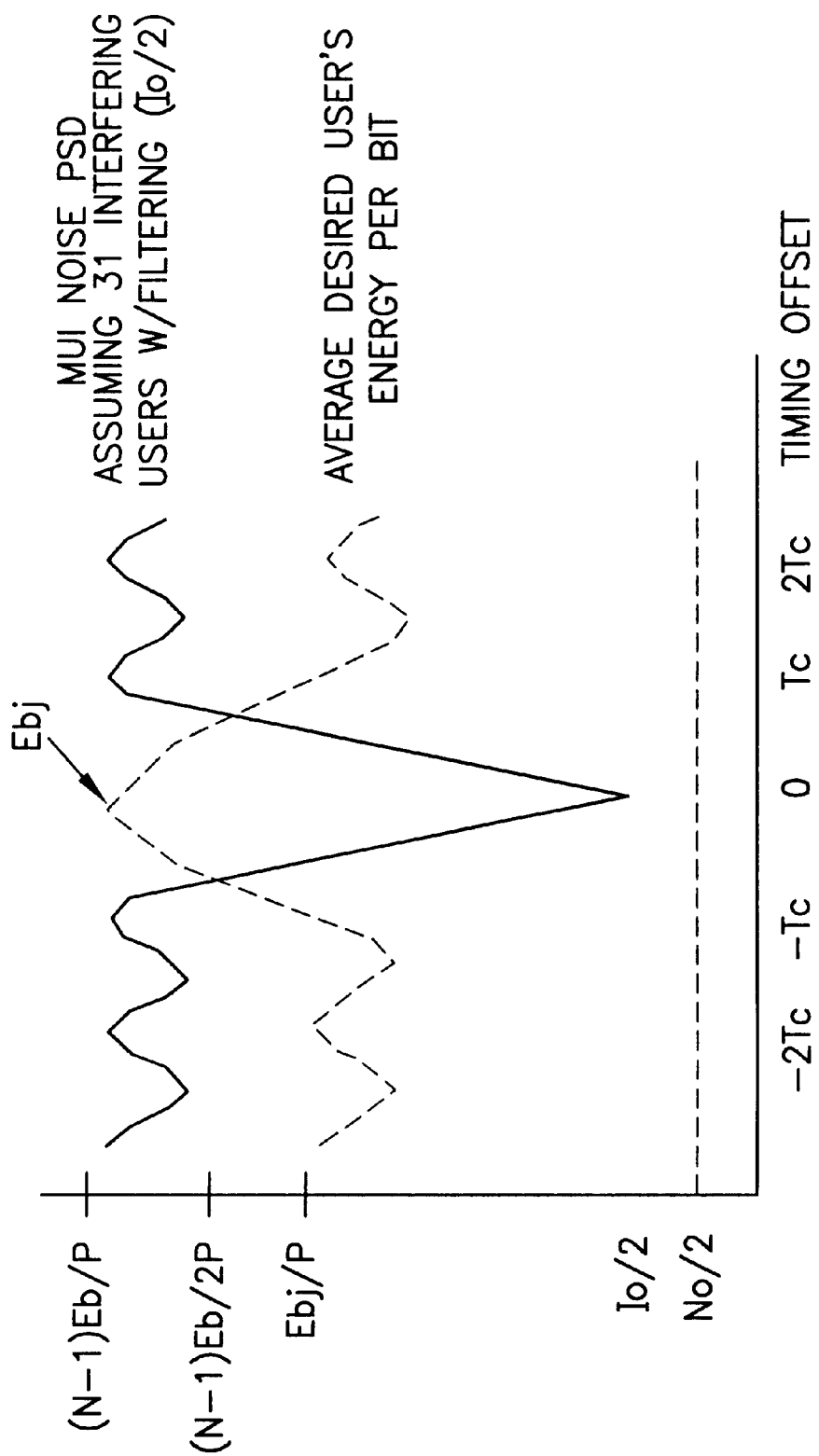
FIG. 5 is a graph that illustrates the energy of a matched filter output due to a desired user's signal, due to interfering user's, and due to background noise as a function of the timing offset of the matched filter.

FIG. 5 illustrates the energy of the matched filter output due to the desired user's signal, due to the interfering users, and due to the background noise as a function of the timing offset of the matched filter. It should be noted that on the forward channel, the user signals are all assumed to perfectly synchronized with each other. The different curves shown in FIG. 5 represent the various components of the received signal, and the sum of these components make up the received strength. It is important to note that the MUI energy due to a receiver chip timing offset is comparable to the energy of the desired user's signal when the receiver is not offset. The implication of this is that a standard acquisition algorithm would not be able to easily distinguish the difference between the offset and synchronized phases. In fact, unless additional averaging takes place, the signal energy is essentially equal to the noise variance, which implies a detection signal-to-noise ratio (SNR) of approximately 0 dB.

It should also be noted that the noise due to MUI and the noise due to background noise are both zero mean noise processes. In the conventional detection procedure, the absolute value of the larger of I and Q channel despreader outputs are taken and the results are averaged over some dwell time. The fact that the noise has a zero mean implies that it is possible to increase the decision SNR by averaging the detection statistics. However, in the case of a heavily loaded system, the averaging time would be required to be long in order to create a large enough SNR to determine reliably whether the receiver is correctly synchronized to a signal.

In contrast with the standard acquisition approach, and in accordance with the invention disclosed in the commonly assigned patent application referred to above, if the receiver 14b of the SU 14 instead despreads a PN code which is not transmitted, then the noise will be "tuned out" when the receiver comes into alignment with the interfering signals. This implies that the SU receiver 14b can look for the "hole in the noise" which occurs a the zero offset phase, and thus determine when the noise energy at a sliding correlator output drops below a threshold. At this time the acquisition circuit can declare, that a lock has occurred. This technique is referred to as the above-mentioned multi-user test (MUT).

Figure 4:
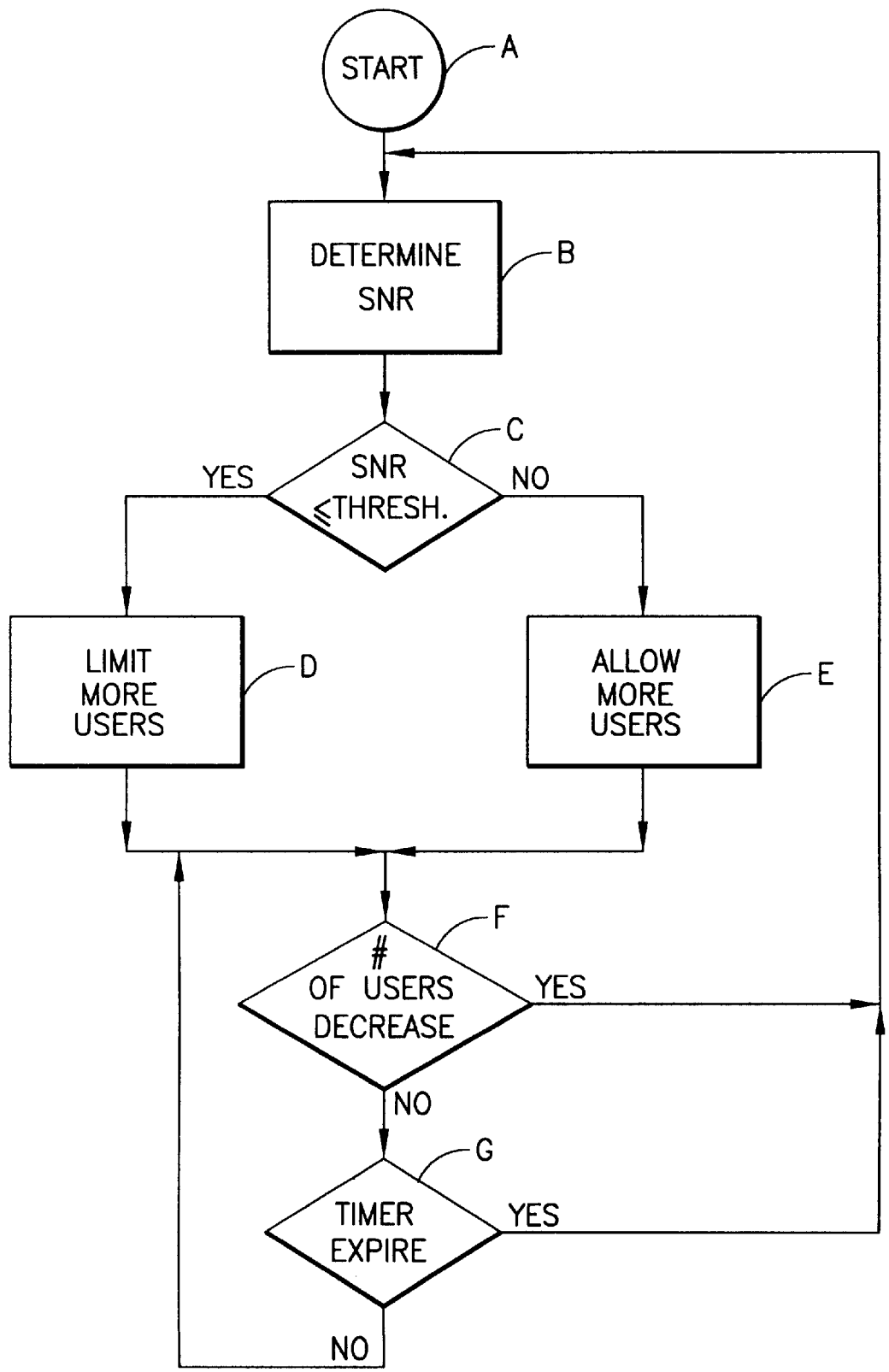
FIG. 4 is a logic flow diagram of a method for varying the system capacity in accordance with this invention.

Having thus described presently preferred techniques for obtaining an estimate of the SNR, reference is now made to FIG. 4 for showing a presently preferred method for varying the capacity of the FWS 10. The method of FIG. 4 may be executed by the RBU controller 12e. At Block A the method starts and at Block B an estimate is made of the SNR, as described above. Preferably the estimate uses the SUT/MUT factors. At Block C the estimated SNR is compared to a threshold value (THRESH), which may be a fixed value or a variable (adaptive) value. The fixed or an initial value for THRESH can be determined empirically, and/or after the FWS 10 has been operated for some time and representative system loading and interference data is obtained.

If the estimated SNR is found to be equal to or Less than THRESH at Block C, control passes to Block D where a user that is requesting service is not accepted. If the estimated SNR is instead found to be greater than THRESH at Block C, control passes to Block E where a user that is requesting service is accepted. Whether Block D or Block E is executed, control passes to Block F to determine if the number of users has decreased (e.g., one or more than one active users have terminated their voice or data connections). If yes, then control passes back to Block B to re-estimate the SNR. If no at Block F (i.e., the total number of users remains the same), then a determination is made at Block G if a timer has expired (the timer can be initialized in either Blocks B, C D or E). A suitable value for the timer is in the range of about 10 seconds to about 30 seconds. If the timer has not expired then control passes back to Block F to once more determine if the number of users has decreased. If the timer is determined at Block G to have expired, then control passes back to Block B to re-estimate the SNR, as the SNR may have increased (or decreased) due to some signal path impairment. In this manner the capacity of the FWS 10 is adaptively varied as a function of the SNR.

Although described in the context of a S-CDMA FWS, those skilled in the art should realize that the teachings of this invention can be applied in many other types of CDMA systems, including asynchronous and partly asynchronous systems having fixed and/or mobile subscriber users.

Thus, while the invention has been particularly shown and described with respect to preferred embodiments thereof, it will be understood by those skilled in the art that changes in form and details may be made therein without departing from the scope and spirit of the invention.

What is claimed is:

1. A method for operating a communications system having a radio base unit (RBU) that uses a code division multiple access (CDMA) airlink for communicating with a plurality of subscriber units (SUs), comprising steps of:
   (a) estimating a signal to noise ratio (SNR), said estimating being based on logarithmic values of a single user test measurement and a multiple user test measurement;
   (b) comparing the estimated SNR to a threshold SNR value; and
   (c) either allowing service to another SU or not allowing service to another SU based on the result of the step of comparing.

2. A method as in claim 1, wherein the step of estimating uses a normalized SNR.

3. A method for operating a communications system having a radio base unit (RBU) that uses a code division multiple access (CDMA) airlink for communicating with a plurality of subscriber units (SUs), comprising steps of:
   (a) estimating a signal to noise ratio (SNR);
   (b) comparing the estimated SNR to a threshold SNR value; and
   (c) either allowing service to another SU or not allowing service to another SU based on the result of the step of comparing; and
   wherein the step of estimating uses a null PN code detection technique.

4. A method for operating a communications system having a radio base unit (RBU) that uses a code division multiple access (CDMA) airlink for communicating with a plurality of subscriber units (SUs), comprising steps of:
   (a) estimating a signal to noise ratio (SNR);
   (b) comparing the estimated SNR to a threshold SNR value; and
   (c) either allowing service to another SU or not allowing service to another SU based on the result of the step of comparing; and
   wherein the step of estimating determines a normalized SNR given by:

$$Eb/No = 20 \log(SUT/MUT) - xdB,$$

where SUT represents a single user test measurement, where MUT represents a multiple user test measurement, and where xdB is an adjustment factor.

5. A method for operating a communications system having a radio base unit (RBU) that uses a code division multiple access (CDMA) airlink for communicating with a plurality of subscriber units (SUs), comprising steps of:

(a) estimating a signal to noise ratio (SNR);

(b) comparing the estimated SNR to a threshold SNR value;

(c) either allowing service to another SU or not allowing service to another SU based on the result of the step of comparing; and (d) establishing a predetermined time;

wherein the steps (a) through (c) are repeated after detecting that a total number of active SUs has decreased, and, if the total number has not decreased, after said predetermined time has elapsed, re-evaluating whether the total number of active SUs has decreased.

6. A method for operating a communications system having a radio base unit (RBU) that uses a code division multiple access (CDMA) airlink for communicating with a plurality of subscriber units (SUs), comprising steps of:

(a) estimating a signal to noise ratio (SNR);

(b) comparing the estimated SNR to a threshold SNR value;

(c) either allowing service to another SU or not allowing service to another SU based on the result of the step of comparing; and (d) establishing a predetermined time;

wherein the steps (a) through (c) are repeated after said predetermined time has elapsed.

7. A method for operating a synchronous code division multiple access (S-CDMA) communication system having a radio base unit (RBU) that uses a CDMA airlink for communicating with a plurality of subscriber units (SUs), comprising steps of:

(a) estimating a signal to noise ratio (SNR) using a null PN code detection technique, the estimated SNR being given by:

$$Eb/No = 20 \log(SUT/MUT) - xdB,$$

where SUT represents a single user test measurement, where MUT represents a multiple user test measurement, and where xdB is an adjustment factor;

(b) comparing the estimated SNR to a threshold SNR value; and (c) one of allowing service to a SU requesting service or not allowing service to the SU requesting service based on the result of the step of comparing.

8. A method as in claim 7, wherein the steps (a) through (c) are repeated after detecting that a total number of active SUs has decreased.

9. A method as in claim 7, wherein the steps (a) through (c) are repeated periodically.

10. A synchronous code division multiple access (S-CDMA) communication system having a radio base unit (RBU) that uses a CDMA airlink for communicating with a plurality of subscriber units (SUs), said RBU comprising a controller for estimating a signal to noise ratio (SNR) using a null PN code detection technique, the estimated SNR being given by $Eb/No = 20 \log(SUT/MUT) - xdB$, where SUT represents a single user test measurement, where MUT represents a multiple user test measurement, and where xdB is an adjustment factor; said controller further comparing the estimated SNR to a threshold SNR value and one of allowing service to a SU requesting service or not allowing service to the SU requesting service based on the result of the comparison.

11. A system as in claim 10, wherein said controller estimates the SNR in response to a reduction in a total number of active SUs.

12. A system as in claim 10, wherein said controller estimates the SNR in response to an expiration of a timer.

* * * * *